United States Patent [19]

Gilli et al.

[11] Patent Number: 4,630,992
[45] Date of Patent: Dec. 23, 1986

[54] MACHINE FOR EFFECTING THE TRANSFER OF OBJECTS IN THE SPACE BETWEEN POSITIONS HAVING PREDETERMINED CO-ORDINATES

[75] Inventors: Luigi Gilli, Luserna San Giovanni; Franco Sartorio, Turin, both of Italy

[73] Assignee: Prima Progetti S.p.A., Turin, Italy

[21] Appl. No.: 537,483

[22] Filed: Sep. 30, 1983

[30] Foreign Application Priority Data

Oct. 1, 1982 [IT] Italy ................. 68155 A/82
Jul. 11, 1983 [IT] Italy ................. 67750 A/83

[51] Int. Cl.$^4$ ................... B25J 9/00; B25J 17/02
[52] U.S. Cl. ................. 414/744 R; 901/17; 901/19
[58] Field of Search ............ 901/17, 18, 19, 29; 414/744 R, 744 A, 744 B, 744 C

[56] References Cited

U.S. PATENT DOCUMENTS

| | | | |
|---|---|---|---|
| Re. 28,437 | 6/1975 | Devol et al. | 901/18 X |
| 2,959,301 | 11/1960 | Willsea | 901/17 X |
| 4,392,776 | 7/1983 | Shum | 414/744 R |

*Primary Examiner*—Terrance L. Siemens
*Attorney, Agent, or Firm*—Albert L. Jeffers; Anthony Niewyk

[57] ABSTRACT

A machine (1) (53) (75) for effecting the transfer of objects in the space between positions having predetermined co-ordinates, in which said objects are supported by a head (25) integral with a pinion (20) (60) mounted rotatable on a slide (12a) (59) sliding in a direction perpendicular to the axis of said pinion (20) (60); the pinion (20) (60) meshing by opposing means with teeth (21) (64, 65) (76, 77) extending along said slide (12a) (59) and axially moving under the bias of driving apparatus (41, 42) (68, 69).

9 Claims, 9 Drawing Figures

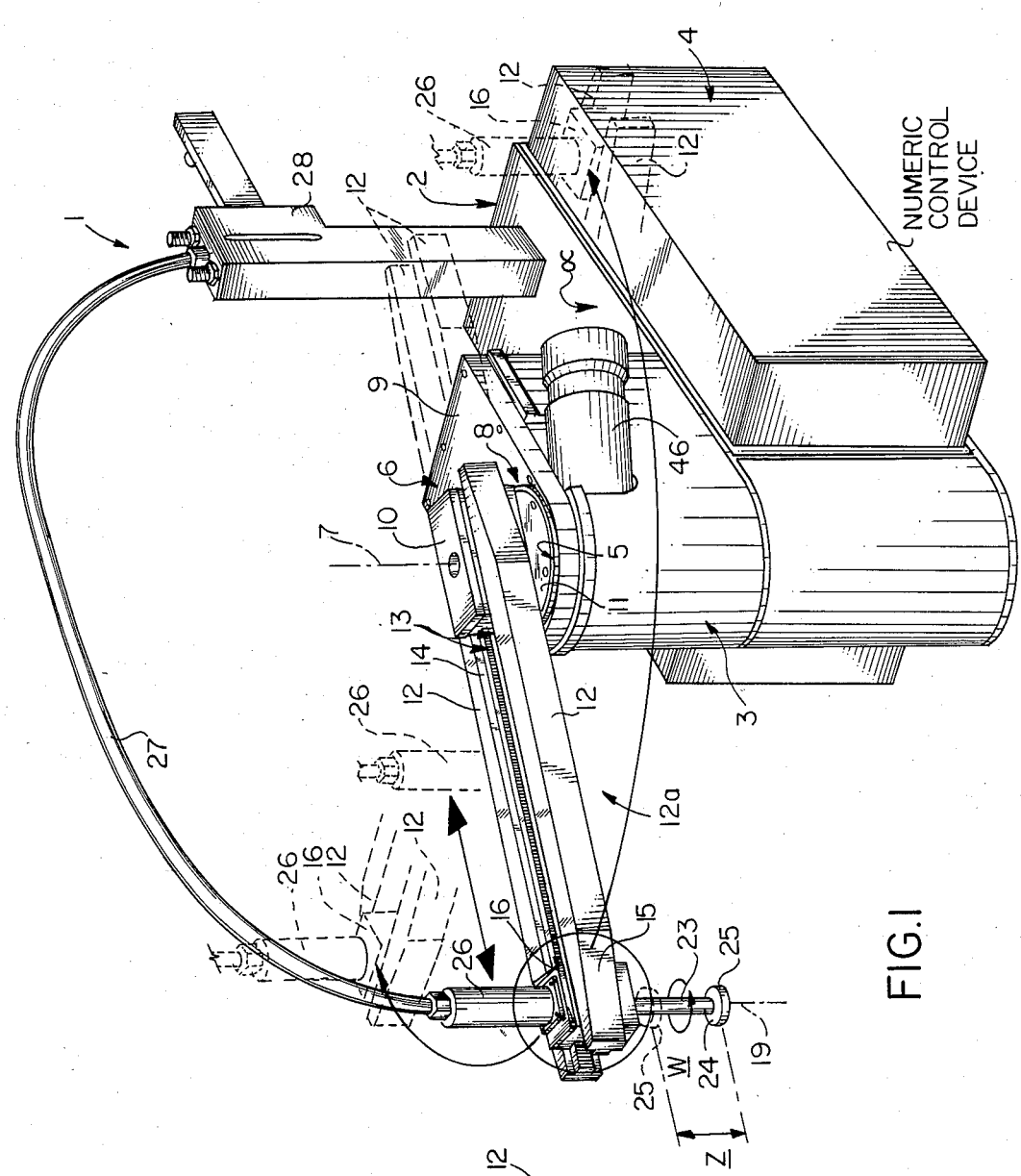
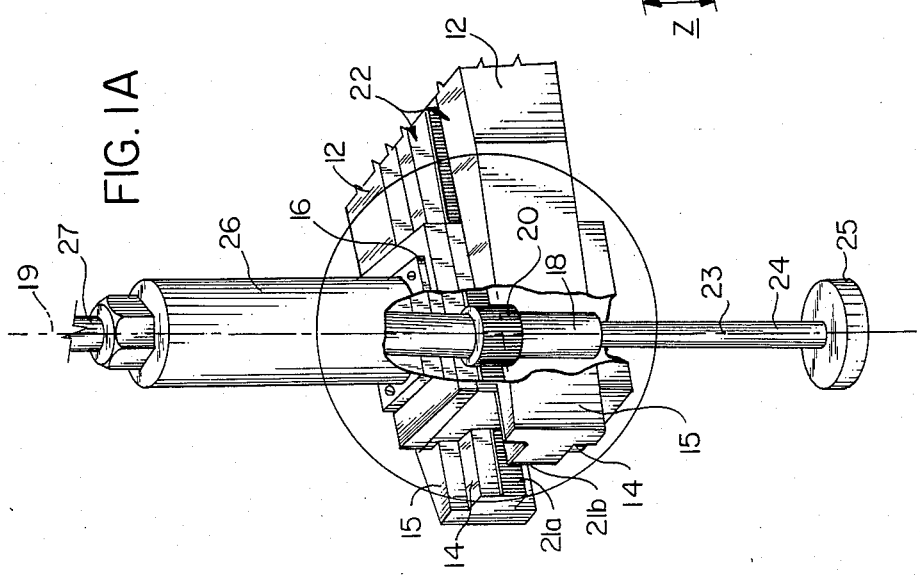

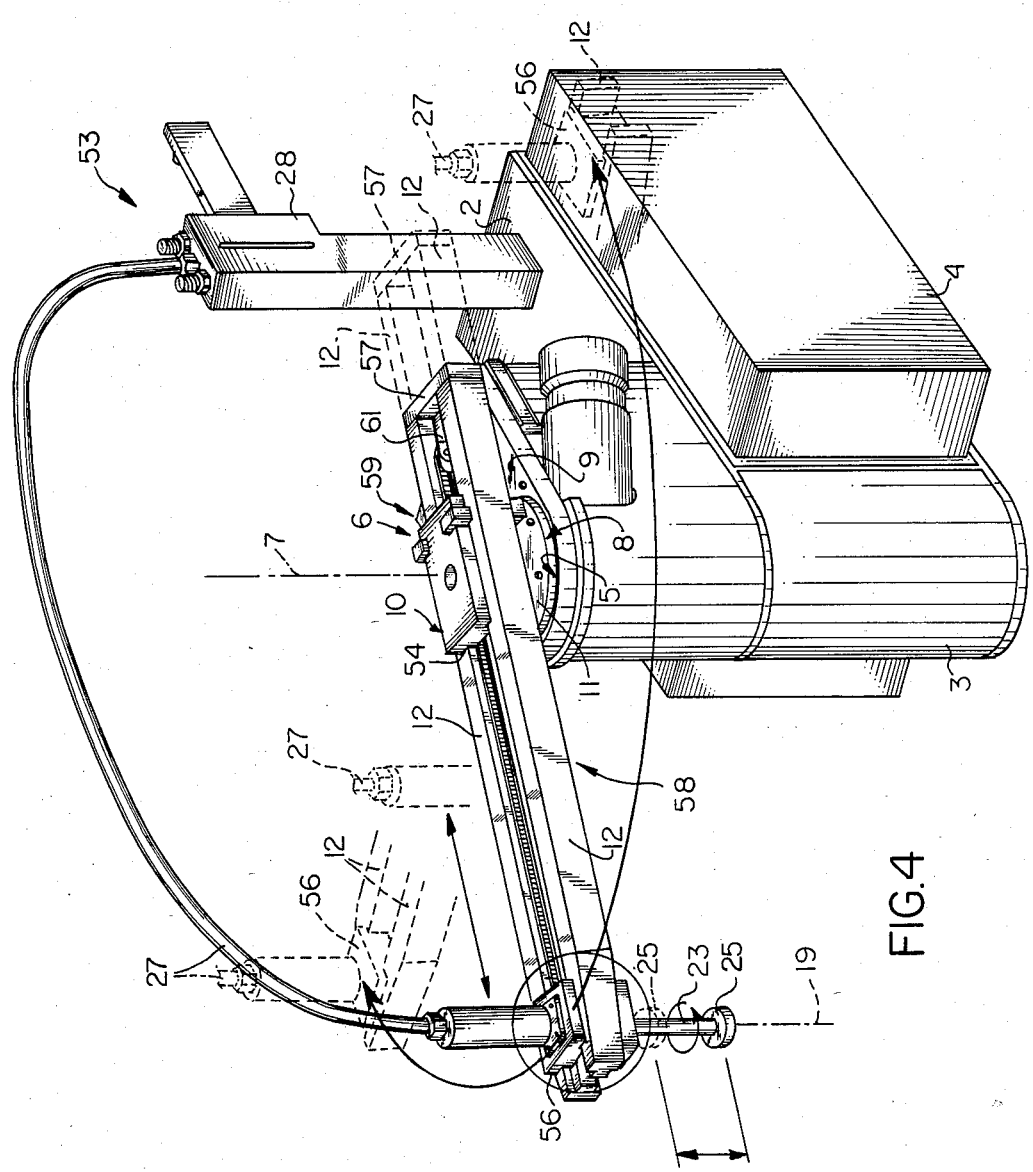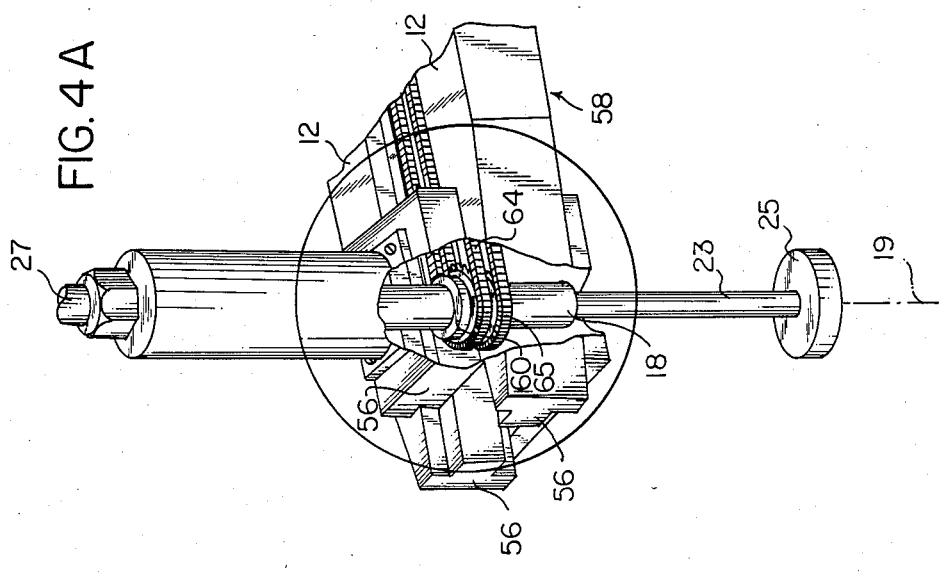

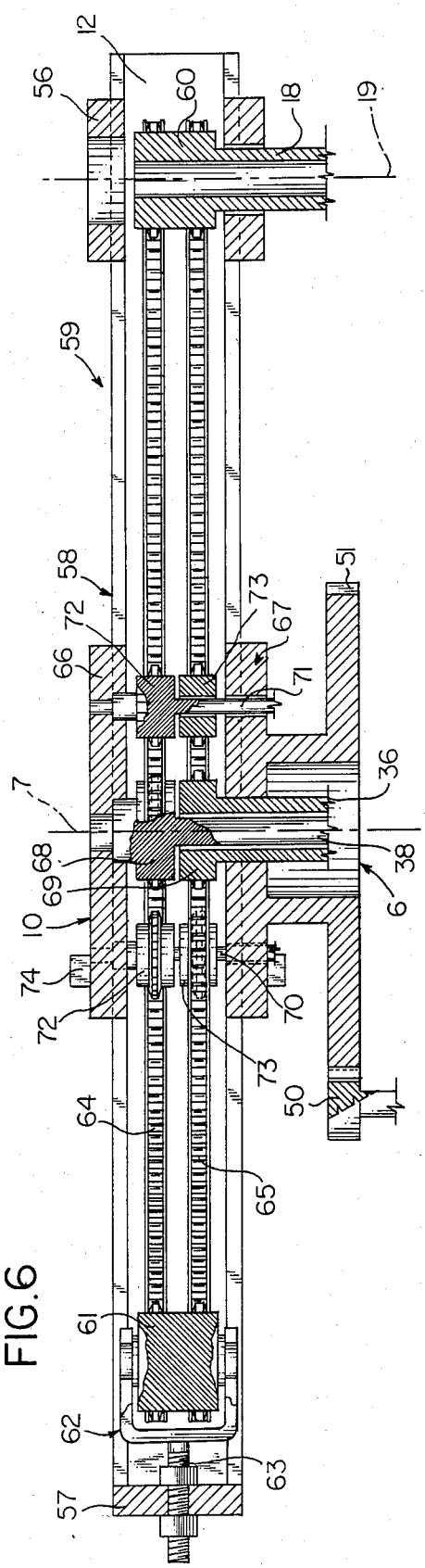
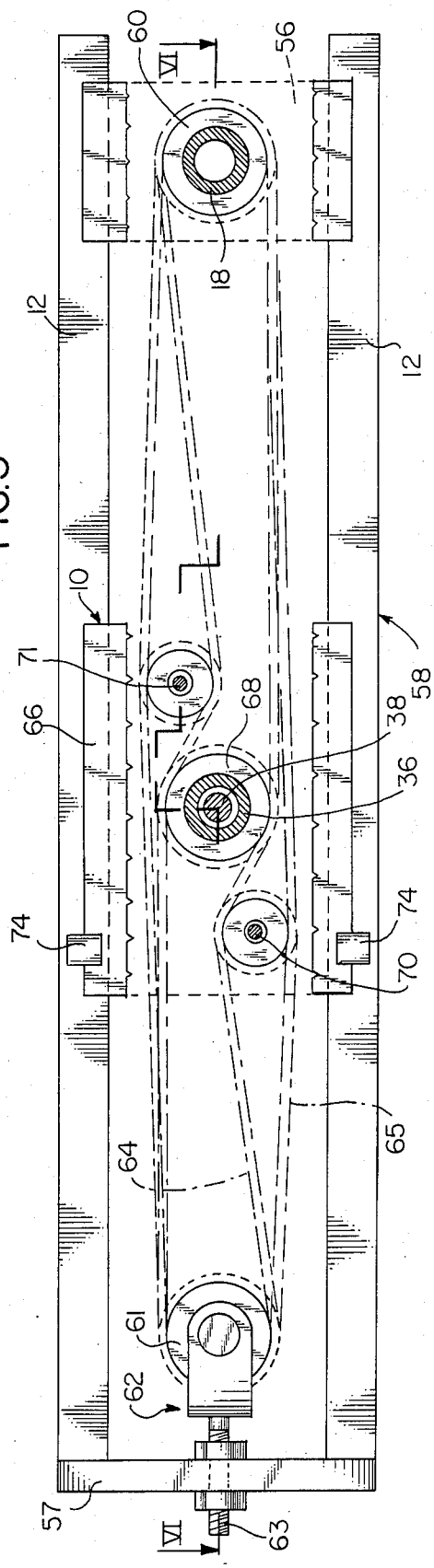
FIG.6
FIG.5

1

MACHINE FOR EFFECTING THE TRANSFER OF OBJECTS IN THE SPACE BETWEEN POSITIONS HAVING PREDETERMINED CO-ORDINATES

BACKGROUND OF THE INVENTION

This invention relates to a machine for effecting the transfer of objects in the space between positions having predetermined co-ordinates. In particular, this invention relates to a manipulating machine programmable by numerical control.

SUMMARY OF THE INVENTION

An object of this invention is to provide a machine for effecting the transfer of objects in the space and capable of controlling with accuracy not only the position but the attitude as well of the objects transferred, so as to be able, in general, to transfer pieces, tools and/or semimanufactured products from a processing line or machine to another, and in particular, to pack finished goods of any kind, transferring them from a conveying line directly inside boxes and arranging them, in these boxes, according to a predetermined lay-out.

A further object of this invention is to provide a machine of the above-mentioned kind, the moving parts of which are connected to drive means that, due to their structure and assembly, are not affected in terms of end result precision by the movement of other moving parts.

Said objects are attained by this invention in that it relates to a machine for effecting the transfer of objects in the space between positions having predetermined co-ordinates, characterized in that it comprises a supporting head mounted rotating about a first axis, sliding means connected to said supporting head in order to slide relative to the same in a direction substantially perpendicular to said first axis, an object-holding head connected to said sliding means and rotating relative to this about a second axis substantially parallel to said first axis, a first and a second driving shafts coaxial with said first axis, and first and second transmission means to transmit a rotation between parallel axes; said first and second transmission means being respectively connected to said first and said second shaft and being both connected to said object-holding head, and numerical control means being provided to selectively control the angular positions of said supporting head and said two shafts about said first axis.

BRIEF DESCRIPTION OF THE DRAWINGS

The invention will be now described with reference to the accompanying drawings, in which:

FIG. 1 represents an axonometric view of a first embodiment of a manipulating machine realized according to this invention;

FIG. 1A represents an enlarged, partially cut-away view of the slide of the manipulating machine of FIG. 1;

FIG. 4 represents an axonometric view of a second embodiment of the manipulating machine according to this invention;

FIG. 4A represents an enlarged, partially cut-away view of the slide of the manipulating machine of FIG. 4;

FIG. 5 is a plan view of a detail in FIG. 4;

FIG. 6 is a cross-section view along cross-section lines VI—VI in FIG. 5; and

DETAILED DESCRIPTION OF THE INVENTION

Referring to FIG. 1, denoted in general at 1 is a manipulating machine suited to effect the transfer of objects in the space from a first to a second position having predetermined co-ordinates. In particular, the machine 1 is suited to draw finished products of relatively small size and weight, such as chocolates, cookies, bars of chocolate and other alimentary products loose and/or packed, or tools or mechanical small items, from a line or a store, and to transfer them directly into boxes and/or packages, laying them down in an orderly way, in sequence, in the same. Furthermore, among other things, the machine 1 is able to transfer pieces and/or semimanufactured products from a processing line or machine to another, changing or keeping unmodified the orientation of the transferred element, according to instructions previously programmed.

Figure 2:
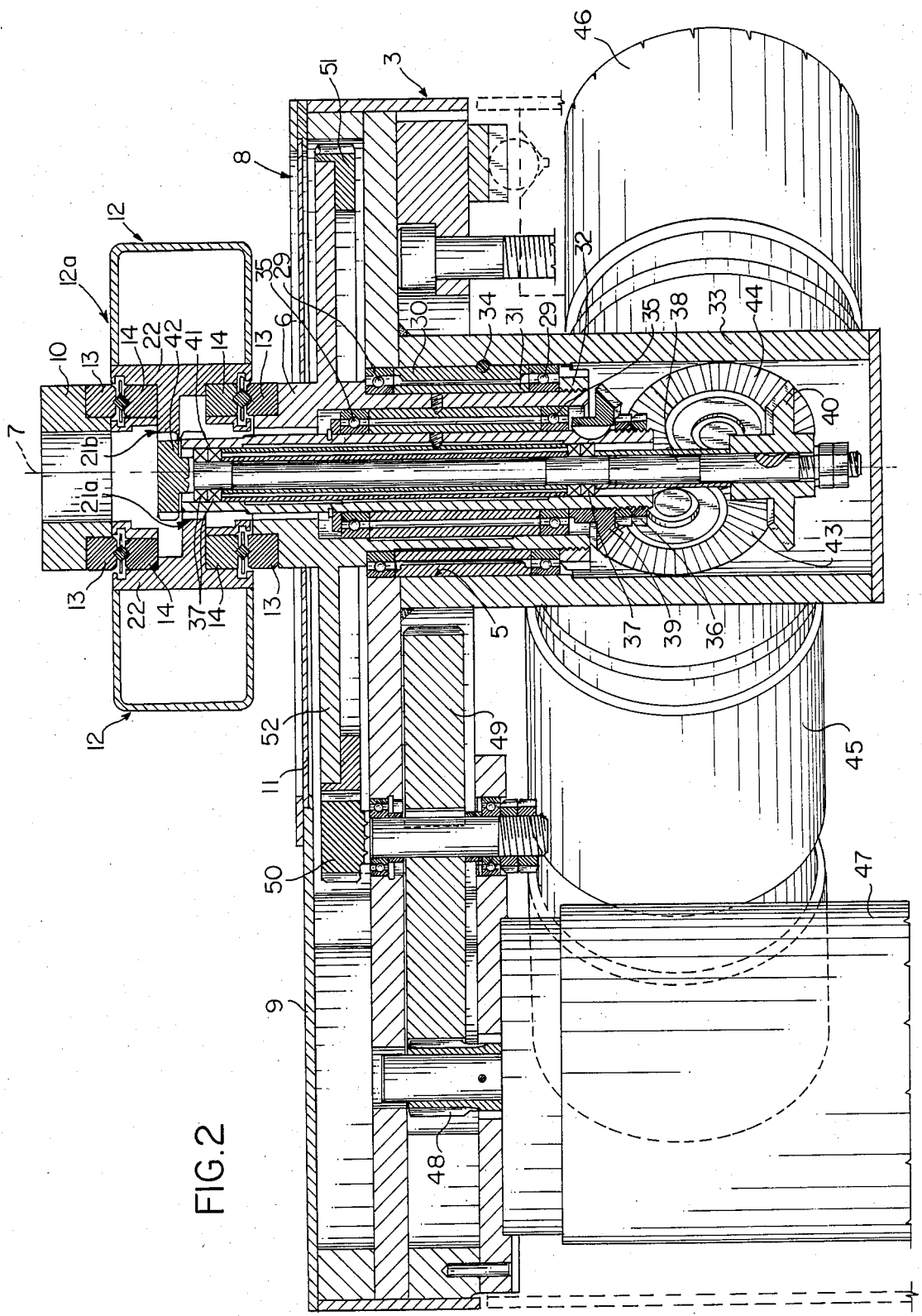
FIG. 2 represents a cutaway view of a detail of the machine in FIG. 1.

The machine 1 comprises a fixed base 2 provided, at an extremity, with a turret 3 integral with the base 2, and with at least a numerical control device or unit 4 realized in any known and convenient way, for example by means of microprocessors, and mounted integral with the base 2, or, according to an alternative construction not represented, arranged far away from the base 2 and connected with the same by means of transducers. Referring also to FIG. 2, inside of cylindrical housing 5 of the turret 3 is accomodated a rotating carousel 6 substantially cylindrical and coaxial with a longitudinal axis 7 of the housing 5. From the housing 5 protrudes, through a hole 8 in a cover 9 of the turret 3, an end head 10 substantially parallelpiped of the carousel 6. Conveniently, the hole 8 is sealed with a dust cover 11.

The head 10 has angularly integral two arms 12 rectilinear and parallel to each other, and is provided with two pairs of rectilinear and facing guides 13, between each pair of which is mounted in a sliding way one of the arms 12. These arms are arranged perpendicularly to the axis 7 and are axially moving between the guides 13, being provided with respective slideways 14 connected in a sliding way to the guides 13. In short, the arms 12 extend cantilevered from the carousel 6, are angularly integral with the same and at the same time form as a whole an articulated slide 12a able to translate perpendicularly to the axis 7. At the respective end 15 opposite the head 10, the arms 12 support a slide 16 mounted sliding along the slide 12a perpendicularly to the axis 7.

The slide 16 is provided with a cylindric bush 18 mounted idle on the slide 16 and supported by the same so as to be free to rotate about an axis 19 coaxial with the bush 18. Outside the bush 18 is formed a cylindric pinion 20, that is coaxial and angularly integral with the bush 18 and is apt to engage simultaneously two rectilinear racks 21a and 21b, parallel to each other, carried by the arms 12. The racks 21a and 21b are integral with a respective arm 12, extend along facing surfaces 22 and lie in different planes parallel to each other. The pinion 20, engaging both the racks 21a and 21b, constrains axially the slide 16 at the ends 15 of the arms 12. Therefore the slide 16 can be approached or moved away from the carousel 6 by only translating the two arms 12 along the guides 13.

Inside the bush 18 is mounted axially sliding and angularly integral with the same a cylindric rod 23 coaxial with the axis 19 and provided at one end 24 with an object-holding head 25 angularly and axially integral with the rod 23. The latter is partially arranged in the interior of a guiding shell 26 and is connected in a way known and not illustrated to a flexible wire 27 suitable to impart to the head 25 a translating movement between two limit positions illustrated in FIG. 1. The wire 27 receives the translating movement from an actuator 28 mounted on the base 2 and integral with the same. Possibly, actuator 28 can be interlocked to the unit 4 realizing a numerical control on the head 25 along the axis 19. The head 25 is coaxial with the axis 19 and is apt to be provided with any manipulating device, known and not illustrated, in order to grip and hold the objects that are displaced by the machine 1, such as a mechanical collet, an electromagnet or a pneumatic suction cup.

With reference to FIG. 2, the carousel 6 is mounted idle in the housing 5 through two bearings 29 placed at opposed ends of spacing rings 30 and 31 and axially clamped on the carousel 6 by means of a ring nut 32. The assembly of the carousel 6 and the bearings 29 is supported by the spacing ring 30, which is in turn supported by a wall 33 of the housing 5 through a pin 34. Inside and coaxial with the carousel 6 is mounted idle by means of bearings 35 an hollow cylindric shaft 36, inside and coaxially to which is mounted idle, by means of bearings 37, a cylindric shaft 38. The shafts 36 and 38 and the carousel are therefore free to rotate around themselves about the axis 7 independently one from the other.

The shafts 36 and 38 are provided, at their opposed ends, with respective bevel pinions 39 and 40 and with respective cylindric pinions 41 and 42 angularly integral with them. The pinions 41 and 42 are coaxial, have the same diameter and are mounted side by side so as to each engage a respective rack 21a and 21b. The conical pinions 39 and 40 permanently mesh with two respective bevel gears 43 and 44 carried by the wall 33 of the housing 5 and therefore integral with the base 2. The gears 43 and 44 are keyed on the output shafts of respective motors 45 and 46, which are fixedly supported by the turret 3.

Inside the turret 3 is arranged a third fixed motor 47 having its axis parallel to the axis 7. The motor 47 operates, by means of a pinion 48, a pair of gears 49 and 50 supported idle by the turret 3. The pinion 50 meshes with a gear-wheel 51 angularly integral with the carousel 6 and mounted on a flange 52 of the same, so as to control the rotation of the carousel 6 and consequently of the slide 12a carried by the same. Conveniently, the motors 47, 45 and 46 are interlocked to the unit 4 that controls their operation according to a predetermined program.

The operation of the machine is as follows. In order to displace the head 25 above an object situated in whatever position and however oriented relative to a plane perpendicular to the axis 7, it will suffice for the head 25 to accomplish four basic movements, illustrated by arrows in FIG. 1, namely:

translate the head 25 parallelly to the axis of the arms 12 so as to change the distance between the axes 7 and 19;

translate the head 25 parallelly to the axis 19 so as to change the dimension denoted as Z;

rotate the head 25 about the axis 19 so as to change an attitude angle W; and rotate the head 25 about the axis 7 so as to change the angular position of the same and of the axis 19 relative to the axis 7.

In the machine 1, in order to rotate the head 25 about the axis 7 of the desired angle, it is only necessary to operate the motor 47 to rotate the carousel 6 by the same angle and consequently rotate the arms 12 and the slide 16 angularly integral with it and carrying the head 25. Such a rotation movement can be limited only by the support 28 and therefore can even be very large, equal or greater than 180° and included, for example, between the two positions shown in FIG. 1 as dotted lines. In order to change the dimension Z of the head 25 it is on the contrary enough to operate the actuator 28.

In order to change the distance between the axes 7 and 19 it is instead necessary to operate simultaneously and with like and opposite speeds the two motors 45 and 46. They rotate the bevel pinions 39 and 40 and consequently the shafts 36 and 38, rotating the cylindric pinions 41 and 42, which, meshing with the respective racks 21a and 21b and revolving in opposite directions, cause the concordant and at the same speed translation of the arms 12 along the guides 13 approaching (or moving away) the slide 16 to the (or from the) head 10. At least, in order to rotate the head 25 about itself, about the axis 19, it will suffice to operate simultaneously and in the same direction of rotation the motors 45 and 46. In this case in effect the arms 12, that are completely independent from one another, will translate in opposite directions taking an asymmetrical position. As a consequence, the pinion 20, which when the arms 12 move concordantly serves only as a constraint to fix the slide 16 to the ends 15, is compelled to rotate because there is a relative sliding movement of the two racks 21a and 21b and of the corrsponding arms 12 relative to the slide 16. Since the movements of the arms 12 are like and opposite, the distance between the slide 16 and the carousel 6 does not change, while the head 25 is rotated by the pinion 20 of the required angle.

From what has been described, it is obvious that the rotation of the head 25 about the axis 19 can take place also automatically, without operating the motors 45 and 46. Indeed, if these motors are kept still and the motor 47 is operated instead, the consequent rotation of the carousel 6 causes the rotation of the arms 12 about the axis 7 while the pinions 41 and 42 are kept still by the bevel gears 43 and 44, the rotation of which is prevented by the stopping of the motors 45 and 46. Therefore the pinions 41 and 42, being coaxial with the rotation axis of the arms 12 and meshing with the racks 21a and 21b, force the arms 12 to translate in an opposite direction along the guides 13 simultaneously with the rotation movement of the carousel 6 and the arms 12. The pinion 20 is therefore forced to rotate, rotating the head 25 of an angle proportional to the rotation angle of the carousel 6. By properly choosing the gear ratio of the different gears, it is possible to obtain that the head 25 rotates of an angle equal and opposite to the rotation angle of the carousel 6, keeping constant the attitude angle W of a gripped object.

Figure 3:
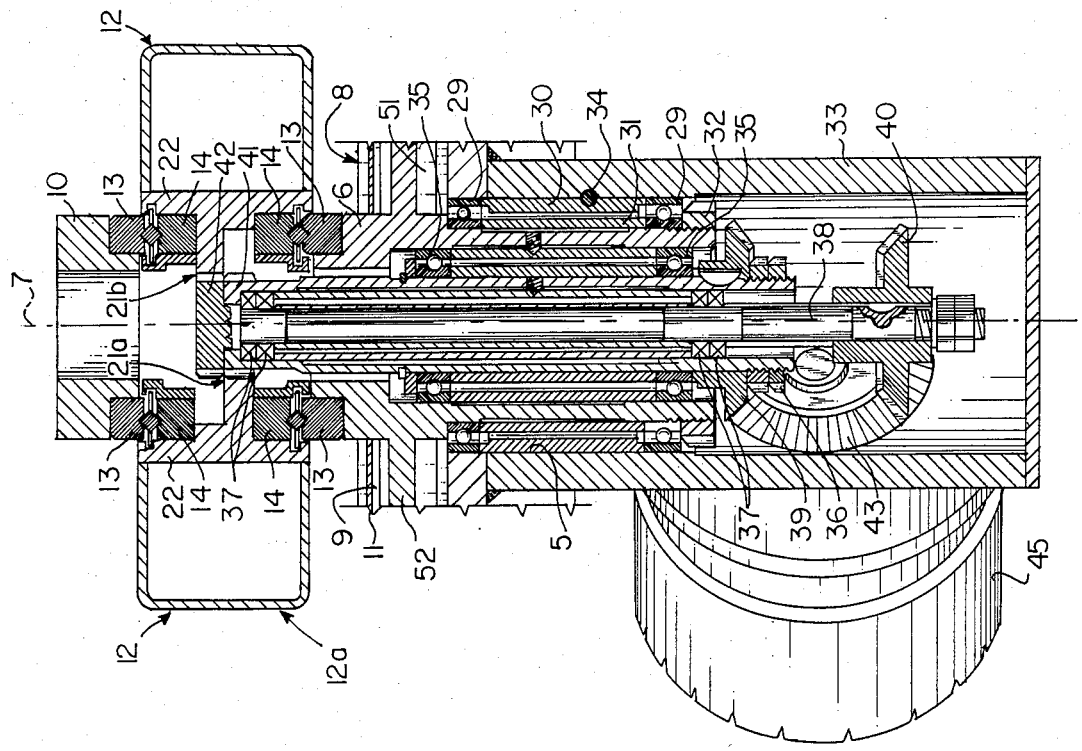
FIG. 3 represents an alternative of the same detail in FIG. 2.

Due to this feature of the machine 1, it is possible, according to the alternative embodiment illustrated in FIG. 3, to surpress the motor 46 and control both the pinions 39 and 40 with the gear 43 alone. In such alternative embodiment, the shaft 38 will be shortened so that both the pinions 39 and 40 mesh with the pinion 43.

According to the alternative embodiment of FIG. 3, in order to change the distance of the axes 19 and 7, it will suffice to operate only the motor 45, which rotates in opposite directions, through the bevel gear 43, the pinions 39 and 40. Consequently the arms 12 will be translated in the same direction. In order to keep costant the attitude angle W of the objects gripped by the head 25 during the rotation of the carousel 6, it will suffice to keep still the motor 45, so as to prevent the rotation of the pinions 41 and 42 in the manner previously described, and produce therefore, simultaneously with the rotation of the carousel 6, the translation in opposite directions of the arms 12 and hence the rotation of the pinion in a direction opposite to that of the carousel 6. It is obvious that the number of teeth of the latter must be such as to rotate the head 25 about the axis 19 of an angle equal to that of rotation of the same about the axis 7.

FIGS. 4 through 7 relate to a manipulating machine 53 mostly similar to the machine 1, and for which are used the same reference employed to indicate the corresponding parts of the machine 1.

In the machine 53, the head 10 is laterally provided with two grooves 54 perpendicular to the axis 7 and engaged each slidingly by a longitudinal ridge 56 of a respective arm 12.

The two arms 12 are interconnected at the extremities by two cross members respectively indicated with 56 and 57 to form a slide 58. This latter is the main member of a transfer unit 59, comprising the slide 58, the head 10, the carousel 6 and the object-holding head 25. The bush 18 of this latter extends through the cross-member 56 along the axis 19 and carries integrally connected a double toothed sprocket 60 coaxial with the axis 19 and cooperating with a double toothed switching sprocket 61, forming the sheave of a pulley 62 connected through a bolt 63 to the cross-member 57, to subtend two ring chains 64 and 65 extending substantially from one end to the other of the slide 58 and through the head 10.

According to an alternative embodimento not illustrated, the chains 64 and 65 are toothed belts.

The head 10 is internally hollow and is limited by two end plates 66 and 67, the second of which supports integrally the carousel 6. Between the plates 66 and 67, the shafts 38 and 36 support respectively two sprockets 68 and 69 respectively meshing with the chains or toothed belts 64 and 65.

Between the plates 66 and 67 are mounted two further shafts 70 and 71 parallel to the shafts 36 and 38 and carrying keyed respective guide pulleys 72 meshing with the chain or toothed belt 64. On each of the shafts 70 and 71 is further mounted idle an other guide pulley 73 meshing with the chain or toothed belt 65.

On the head 10 are further mounted two electromagnetic jaws 74 which, when activated, can lock the slide 58 relative to the head 10.

Figure 7:
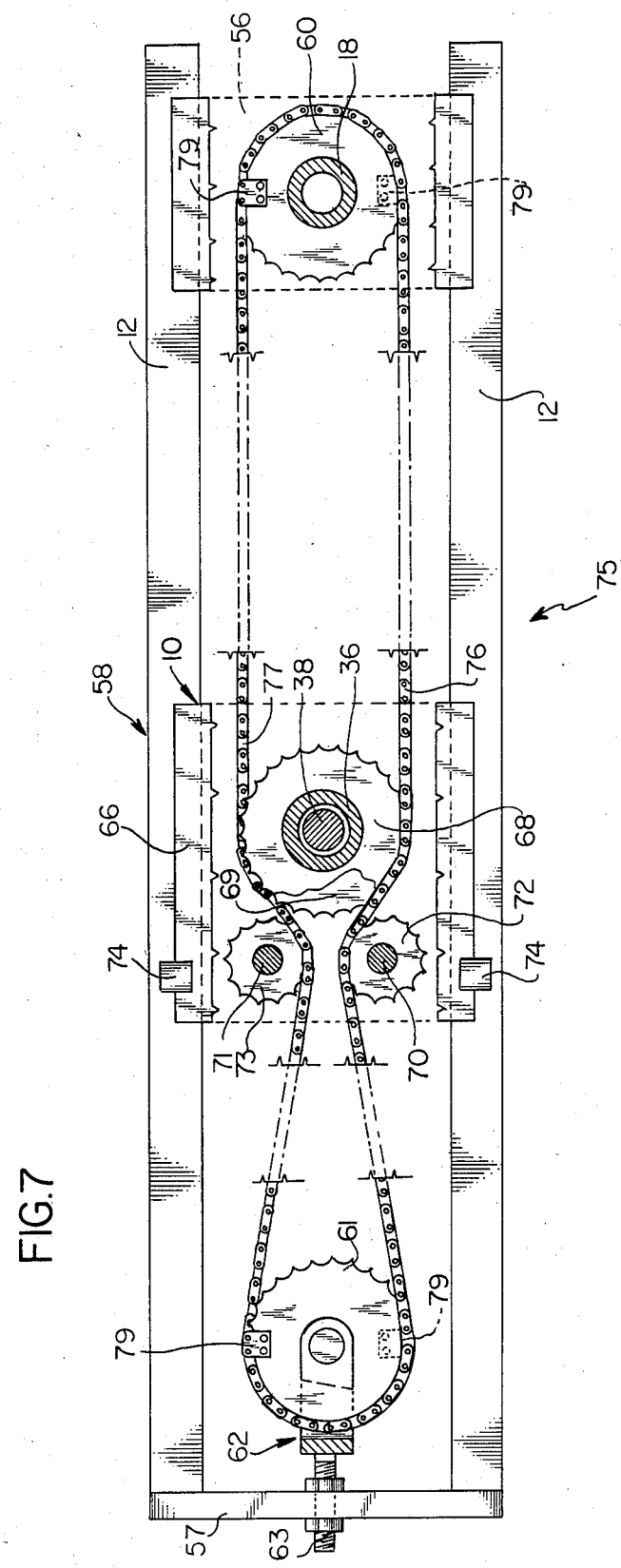
FIG. 7 represents a plan view of an alternative detail in FIG. 5.

The alternative embodiment illustrated in FIG. 7, relates to a transfer unit 75 substantially similar to the transfer unit 53, from which it differs in that the chains or toothed belts 64 and 65 of the unit 59 are substituted with two half-chains or toothed belts 76 and 77 extending between sprockets 60 and 61 and partially wound around the same and the respective sprockets 68 and 69. In particular, the opposed ends of the half-chains or toothed belts 76 and 77 are integrally connected to the sprockets 60 and 61 by means of the attachment devices 79. Further, in unit 75 the two shafts 70 and 71 are placed both on the same side of the shafts 36 and 38 and support the first a guide pulley 72 and the second a guide pulley 73.

Since, at least from an ideal point of view, the operation of the chains or toothed belts 64 and 65 is exactly the same as that of the half-chains or toothed belts 76 and 77, the operation of the machine 53 will be now described with reference to FIGS. 1, 5 and 6 and to the transfer unit 59.

In the case the sprockets 68 and 69 are kept locked relative to a fixed reference, a rotation of the carousel 6 in one direction, for example clockwise, causes the winding of the chain or toothed belt 64 on the sprocket 68 and the unwinding of the chain or toothed belt 65 from the sprocket 69 with simultaneous rotation of the sprocket 61 and, therefore, of the head 25 counterclockwise through an angle equal to the angle of rotation of the carousel 6. In this manner, it is possible for the head 25 to seize an object and deposit it, after having rotated it about the axis 7, keeping inalterated its original attitude.

Except for the above-mentioned event, the rotation about the axis 19 and the translation along the line joining the axes 7 and 19 are solely controlled by the chains or toothed belts 61 and 65 and by the corresponding powered sprockets 68 and 69.

With reference in particular to FIGS. 5 and 6, if the sprockets 68 and 69 are operated at the same speed and in the same direction, and actuating simultaneously the jaws 74 to lock the slide 58 on the head 10, the sprocket 61 will be rotated in the same direction as the chains or toothed belts 64 and 65 and will rotate the head 25 about the axis 19.

However, if the two sprockets 68 and 69 are rotated at the same speed, but in opposed directions, the two chains or toothed belts 64 and 65 tend to give to the sprocket 61 like and opposite rotations keeping it, in effect, angularly locked relative to the slide 58 and causing the axial sliding of the later relative to the head 10 and, therefore, a displacement of the head 25 along the line joining the axes 7 and 19.

From the foregoing, it is possible to argue that, by controlling the motors 47, 45 and 46 for the operation of the pinion 50 and of the sprockets 68 and 69 through the unit 4, it is possible to seize, by means of the head 25, an object from an initial position having predetermined coordinates imparting to it a desired attitude and, in particular, keeping its original attitude.

What is claimed is:

1. A machine for transferring objects in space between positions having predetermined co-ordinates, the machine comprising
a fixed tubular support member extending along a first axis;
a tubular carousel coaxial with said tubular support member and rotatably supported thereby;
a support head connected to said carousel for rotation therewith about said first axis;
sliding means connected to said support head to slide relative to said support head in a direction substantially perpendicular to said first axis;
an object-holding head supported by said sliding means so as to be rotatable relative thereto about a second axis substantially parallel to said first axis;
a first and a second shaft coaxial with each other and with said carousel and supported by said carousel so as to be rotatable relative to each other and to said carousel;

drive means carried by said fixed tubular member to selectively rotate said first and second shafts and said carousel about said first axis; and first and second transmission means of the type adapted for transmission of rotation between members mounted for rotation about respective axes parallel to each other, said first and second transmission means being coupled with said first and said second shafts respectively, and both said first and second transmission means coupled with said object-holding head.

2. A machine according to claim 1, characterized in that said sliding means comprises:

a first and a second arm parallel to each other and independently movable, said arms located on opposite sides of said supporting head and slidingly connected with the same;

a second slide being slidingly connected with said two arms to slide along the same rotatably supporting said object holding head; and wherein said first and second transmission means extend respectively along said first and second arms and are integral with the same.

3. A machine according to claim 2, characterized in that said first and second transmission means comprises:

a rack extending along each of said relative arms;

a pinion keyed on each of said first and second shafts and coupled with a respective rack; and a pinion being integral with said object-holding head and coupled with both of said racks.

4. A machine for transferring objects in space between positions having predetermined co-ordinates, the machine comprising:

a fixed tubular support member extending along a first axis;

a tubular carousel coaxial with said tubular support member and rotatably supported thereby;

a support head connected to said carousel for rotation therewith about said first axis;

sliding means connected to said support head to slide relative to said support head in a direction substantially perpendicular to said first axis having a first and a second arm parallel to each other and independently movable, each of said arms located on opposite sides of said supporting head and slidingly connected with the same;

a second slide slidingly connected with said two arms so as to slide along the same;

an object-holding head supported by said second slide so as to be rotatable relative thereto about a second axis substantially parallel to said first axis;

a first and a second shaft coaxial with each other and with said carousel and supported by said carousel so as to be rotatable relative to each other and to said carousel;

drive means carried by said fixed tubular member to selectively rotate said first and second shafts and said carousel about said first axis; and first and second transmission means coupled with first and second shafts respectively and both said first second transmission means coupled with said object-holding said first and second transmission means having a rack extend along each of said relative arms, a pinion keyed on each of sai first and second shafts and coupled with a respective rack, and pinion integral with said object-holding head coupled with both of said racks.

5. A machine for transferring objects in space between positions having predetermined co-ordinates, comprising:

a supporting head mounted rotatable about a first axis;

a first and a second arm parallel to each other and independently movable, each of said arms located on opposite sides of said supporting head slidingly connected thereto whereby said arms slide substantially perpendicularly to said first axis;

a second slide slidingly connected with said arms to slide along the same;

an object-holding head rotatably supported by said second slide, said object-holding head rotating about a second axis substantially parallel to said first axis;

a first and a second driving shaft coaxial with said first axis; and a first and a second transmission means connected to said first and said second shafts respectively and each of said first and second transmission means being connected to said object-holding head, said first and second transmission means having a rack extending along each of said relative arms, a pinion keyed on each of said first and second shafts and coupled with a respective rack, and a pinion integral with said object-holding head and coupled with both of said racks.

6. A machine according to claim 1, characterized in that said sliding means (59) comprise a first and a second arm (12) parallel one to the other and a first and a second end cross member (56, 57) extending between said two arms (12) and integral with the same; the said arms (12) being positioned on opposite sides of said supporting head (10) and being slidingly connected with the same; said first and second transmission means (64, 65) (76, 77) being flexible, extending between said two arms (12) and being connected along an intermediate section thereof with said first and second shaft (36, 38); and locking means (74) being provided to lock said sliding means (59) relative to said supporting head (10).

7. A machine according to claim 6, characterized in that said sliding means (59) comprise further a first and a second sprocket (60, 61) rotatably supported by said first and respectively said second cross member (56, 57) and one of which is angularly integral with said object-holding head (25); a further sprocket (68, 69) being keyed on each one of said first and second shafts (36, 38) and being connected with a respective flexible transmission means (64, 65) (76, 77), and said first and second sprockets (68, 69) being each connected with both said flexible transmission means (64, 65) (76, 77).

8. A machine according to claim 7, characterized in that each of said flexible transmission means (64, 65) is a continuous loop which extends about said first and second sprocket (60, 61) and the said relative further sprocket (68, 69).

9. A machine according to claim 7, characterized in that each of said flexible transmission means (76, 77) extends about the said respective further sprocket (68, 69) and has two opposing ends integrally connected with the periphery of said first and, respectively, said second sprocket (60, 61).

* * * * *